(12) United States Patent
Wanke

(10) Patent No.: US 10,690,226 B1
(45) Date of Patent: Jun. 23, 2020

(54) VEHICLE DRIVETRAIN SYSTEM

(71) Applicant: Matthew T. Wanke, Elkhart, IN (US)

(72) Inventor: Matthew T. Wanke, Elkhart, IN (US)

( * ) Notice: Subject to any disclaimer, the term of this patent is extended or adjusted under 35 U.S.C. 154(b) by 22 days.

(21) Appl. No.: 16/158,621

(22) Filed: Oct. 12, 2018

(51) Int. Cl.
| | | |
|---|---|---|
| *F16H 37/08* | (2006.01) | |
| *F16H 47/04* | (2006.01) | |
| *F16H 57/037* | (2012.01) | |
| *F16H 57/02* | (2012.01) | |
| *B60W 10/06* | (2006.01) | |

(52) U.S. Cl.
CPC ........... *F16H 37/082* (2013.01); *F16H 47/04* (2013.01); *F16H 57/037* (2013.01); *B60W 10/06* (2013.01); *B60Y 2200/221* (2013.01); *F16H 2057/02017* (2013.01); *F16H 2057/02043* (2013.01); *F16H 2057/02069* (2013.01)

(58) Field of Classification Search
None
See application file for complete search history.

(56) References Cited

U.S. PATENT DOCUMENTS

| | | | | |
|---|---|---|---|---|
| 3,388,760 | A * | 6/1968 | Christie | F16H 37/08 180/24.09 |
| 6,960,149 | B2 * | 11/2005 | Ziemer | F16H 3/66 475/276 |
| 7,004,878 | B2 * | 2/2006 | Gumpoltsberger | F16H 37/0833 475/218 |
| 7,070,534 | B2 * | 7/2006 | Pelouch | F16H 37/046 475/207 |
| 7,220,210 | B2 * | 5/2007 | Soh | F16H 3/663 475/275 |
| 7,604,561 | B2 * | 10/2009 | Earhart | F16H 37/04 475/218 |
| 7,695,390 | B2 * | 4/2010 | Phillips | F16H 37/0833 475/218 |
| 8,360,925 | B2 * | 1/2013 | Kraynev | F16H 37/042 475/277 |
| 8,439,787 | B2 * | 5/2013 | Salamandra | F16H 37/046 475/207 |
| 9,022,891 | B2 * | 5/2015 | Phillips | F16H 3/78 475/218 |
| 9,382,975 | B2 * | 7/2016 | Robinette | F16H 3/093 |
| 10,451,152 | B2 * | 10/2019 | Hwang | B60K 6/48 |

* cited by examiner

*Primary Examiner* — Dirk Wright
(74) *Attorney, Agent, or Firm* — Gulf Coast Intellectual Property Group

(57) ABSTRACT

A drivetrain assembly for a motor vehicle such as a tractor-trailer rig wherein the drivetrain assembly includes a transmission and a rear end differential that have gearing operable to lower the operational engine RPM's of the vehicle. The transmission of the present invention includes a gearing ratio having a stepped percentage difference intermediate each gear. The final gear ratio of the transmission ranges between 0.47 to 1 and 0.63 to 1. A rear end gear ratio is present within the range of 3.08 to 1 to 3.90 to 1. The rear end gear ratio is approximately five and a half to six and a half greater than the ratio of the final gear of the transmission. The engine RPM's of the vehicle are at a lower RPM when the transmission is in its final gear or speed resulting in less fuel injection cycles and improved fuel economy.

5 Claims, 4 Drawing Sheets

VEHICLE DRIVETRAIN SYSTEM

FIELD OF THE INVENTION

The present invention relates generally to vehicle drivetrain assemblies, more specifically but not by way of limitation, a drivetrain assembly for a larger vehicle such as but not limited to a tractor trailer wherein the components of the drivetrain system of the present invention are configured to provide operation of the motor at a lower RPM so as to improve fuel economy while maintaining the engine torque transfer to the drive wheels.

BACKGROUND

Millions of tractor-trailer rigs are operated on the roads everyday. These large vehicles are a primary source of logistics for all types of goods and products and are capable of handling large loads. The average fuel economy for a tractor-trailer vehicle is about six miles per gallon. Fuel costs is one of the most significant categories in operating a tractor-trailer vehicle. Many attempts have been made to optimize fuel consumption in order to reduce the overhead costs of operating a tractor-trailer vehicle. One area of development for improving fuel economy is the utilization of what is known in the art as down sped motors. The concept behind down sped motors is to maintain engine RPM's low so as to reduce the fuel injection cycles and as such improve the fuel economy of the vehicle. Lower engine RPM's results in lower fuel consumption and as such can reduce the cost of operating a tractor-trailer vehicle.

One issue with the aforementioned is the increased strain on the drivetrain components. Existing implementations of a down sped motor include rear end differential gear of ratios such as but not limited to 1.91-2.40 to 1. These low gear ratios result in a lower engine RPM at cruising speed of the vehicle but also result in less torque transferred to the drive wheel. One major issue with utilizing the aforementioned gear ratio to achieve a lower engine RPM is the torque remains in the drivetrain components and as such results in broken u-joints and other component failure. Having conventional transmission ratios and rear end gears can result in an increase fuel consumption under certain conditions. When a driver encounters more adverse conditions such as steep roads or high winds, the driver will apply more accelerator to maintain vehicle speed which results in lower fuel economy.

Accordingly, there is a need for a vehicle drivetrain system that is configured to maintain a lower engine RPM while further providing reduced torque on the drivetrain components and wherein the drivetrain system allows engine RPM's to be lower at cruising speed so as to improve fuel economy.

SUMMARY OF THE INVENTION

It is the object of the present invention to provide a vehicle drivetrain system configured to improve the fuel economy of the vehicle that is configured to reduce the torque present in the driveline and ensure transfer to the drive wheels.

Another object of the present invention is to provide a vehicle drivetrain system operable to maintain an engine at a lower RPM wherein the drivetrain includes a rear end differential having pulling gears installed therein.

A further object of the present invention is to provide a vehicle drivetrain system configured to improve the fuel economy of the vehicle wherein the engine RPM is controlled by a unique set of gear ratios in the transmission of the driveline assembly.

Still another object of the present invention is to provide a vehicle drivetrain system operable to maintain an engine at a lower RPM at cruising speed wherein the transmission of the present invention is configured to have at least one additional gear having a very low gear ratio and/or providing adjustment of a final gear.

An additional object of the present invention is to provide a vehicle drivetrain system configured to improve the fuel economy of the vehicle wherein the drivetrain ratios of the rear end and transmission provide the ability to maintain a desired speed at a lower engine RPM.

Yet a further object of the present invention is to provide a vehicle drivetrain system operable to maintain an engine at a lower RPM wherein the torque in the driveline is reduced so as to improve the life expectancy of the components thereof.

Another object of the present invention is to provide a vehicle drivetrain system configured to improve the fuel economy of the vehicle wherein the drivetrain system distributes the required drivetrain ratios to deliver a desired vehicle speed amongst the transmission and the rear end differential.

Still a further object of the present invention is to provide a vehicle drivetrain system operable to maintain an engine at a lower RPM wherein the drivetrain of the present invention is operably coupled a conventional combustible motor.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
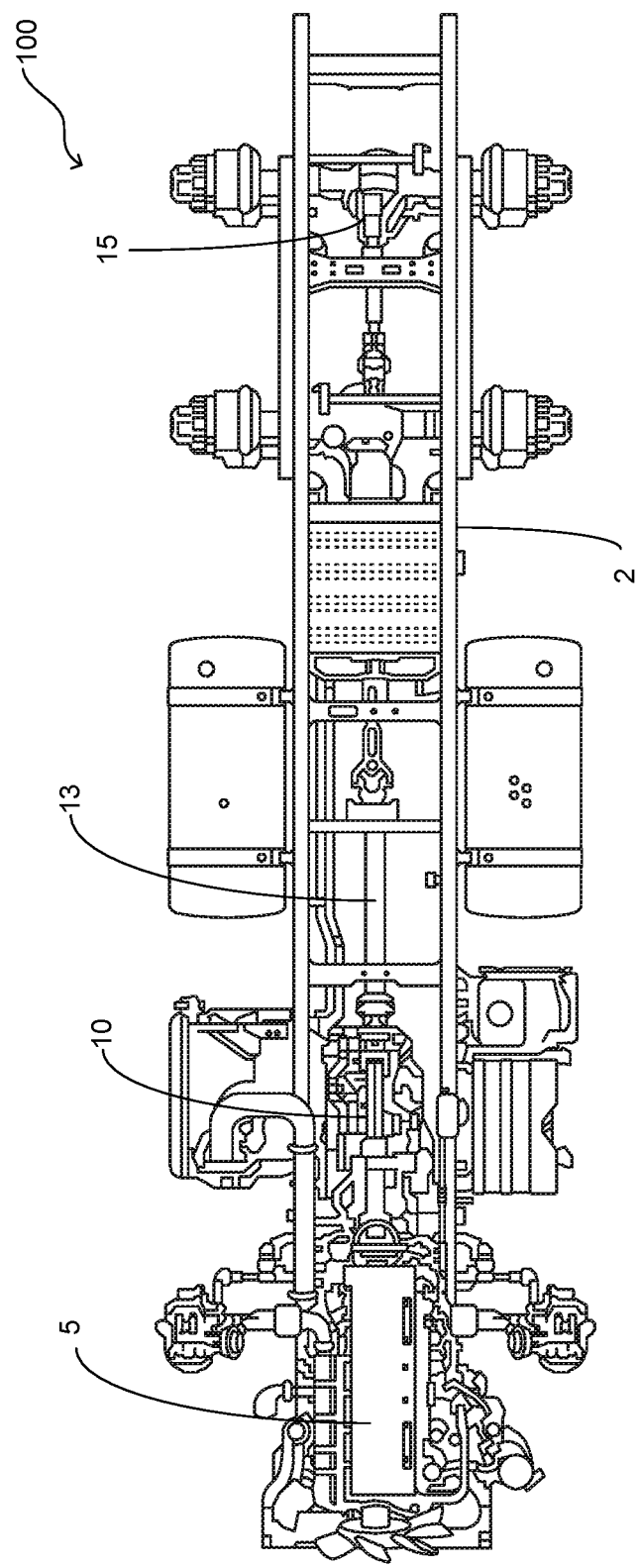
FIG. 1 is a diagrammatic view of an exemplary drivetrain.

Referring now to the drawings submitted herewith, wherein various elements depicted therein are not necessarily drawn to scale and wherein through the views and figures like elements are referenced with identical reference numerals, there is illustrated a vehicle drivetrain system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the FIG. 1 submitted as a part hereof, the drivetrain system 100 includes a combustible motor 5, a transmission 10 and a rear end differential 15 wherein the rear end differential 15 is operably coupled to the transmission 10 utilizing a drive shaft 13. The drivetrain system 100 is secured within a vehicle frame 2 utilizing suitable durable techniques. While the preferred embodiment of the present invention is for larger vehicle applications such as but not limited to tractor trailer rigs, it is contemplated within the scope of the present invention that the drivetrain system 100 could be employed in any type of vehicle.

Figure 4:
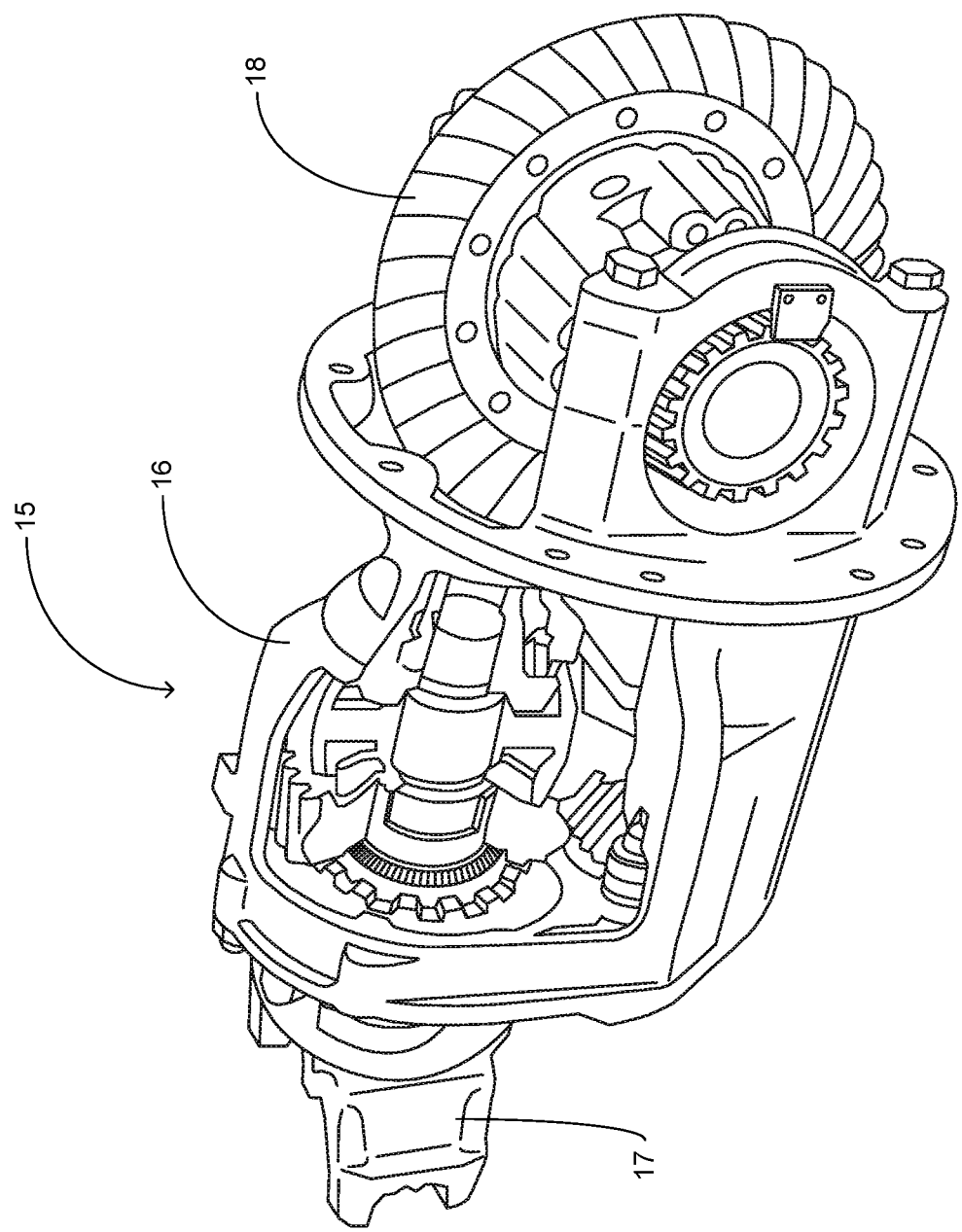
FIG. 4 is a perspective view of a rear end differential of the present invention.

Referring to FIG. 4 herein, the rear end differential 15 is illustrated therein. The rear end differential 15 includes a housing 16 that is manufactured from a durable material such as but not limited to metal. The illustration herein in FIG. 4 has portions of the housing 16 removed so as to illustrate the interior components. The rear end differential 15 is coupled to shaft 13 utilizing u-joint 17, which is a conventional u-joint known in the art. The rear end differential includes gearing 18 that is operable to rotate in a ratio with the drive shaft 13. The present invention utilizes a rear end differential gear ratio the is within the range of 3.08-3.90 to 1. As is known in the art, this gear ratio refers to the drive shaft rotation with respect to the wheel rotation. By way of example, a 3.08 to 1 gear ratio translates to the drive shaft turning 3.08 revolutions for every one turn of the drive wheel on the vehicle. For the present invention, it is desirable to have a rear end differential gear ratio that is within the range of 3.08-3.90 to 1. The present invention is focused on ensuring the ability for a tractor trailer rig to haul a load while producing a lower engine RPM so as to improve fuel economy. Existing attempts at achieving this utilize gear ratios such as but not limited to 1.91 to 1. The problem with this approach is too much engine torque remains in the drivetrain components and items such as but not limited to drive shafts and u-joints are prone to earlier failure.

Figure 2:
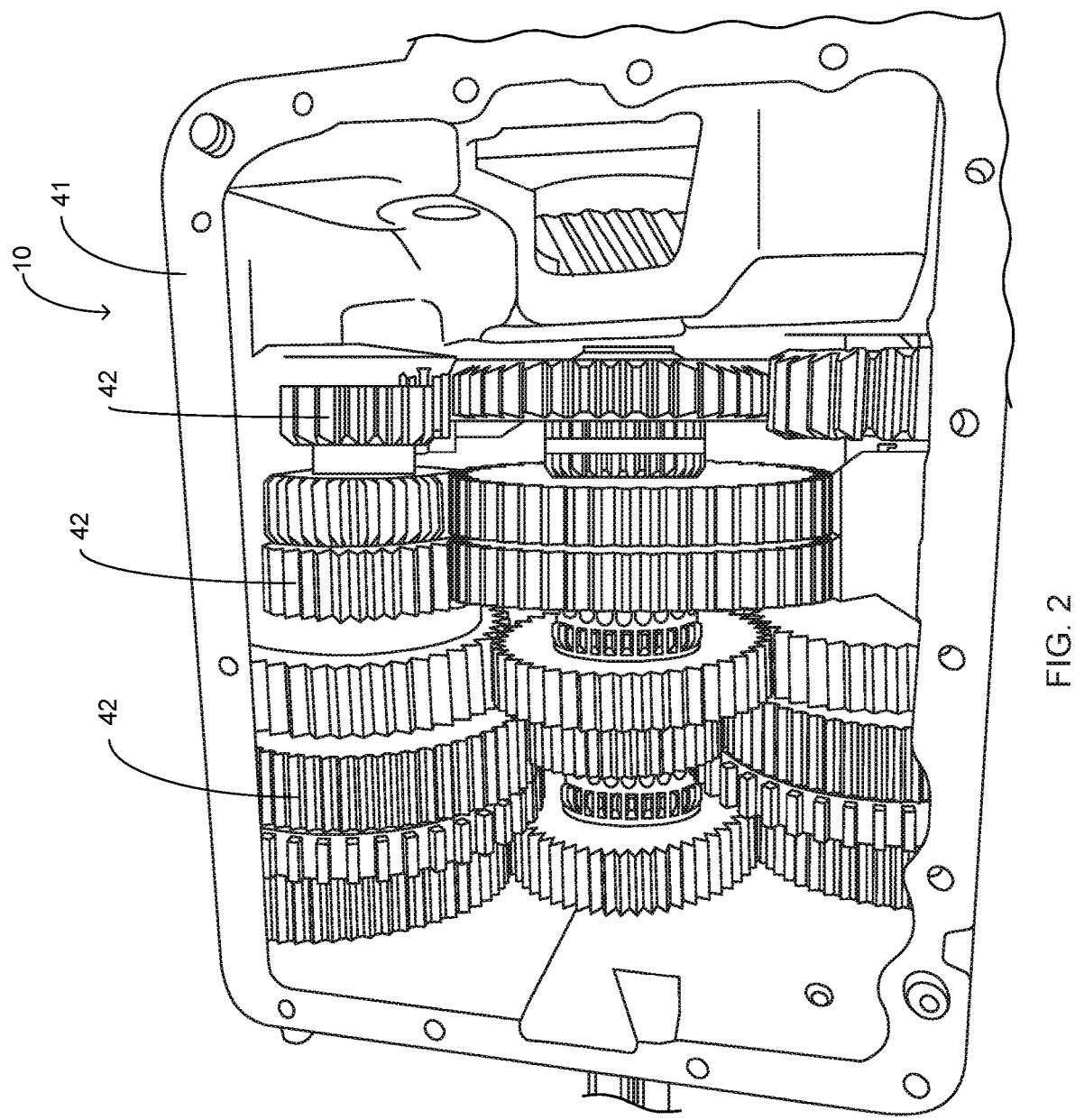
FIG. 2 is a top view of a ten speed transmission of the present invention.
Figure 3:
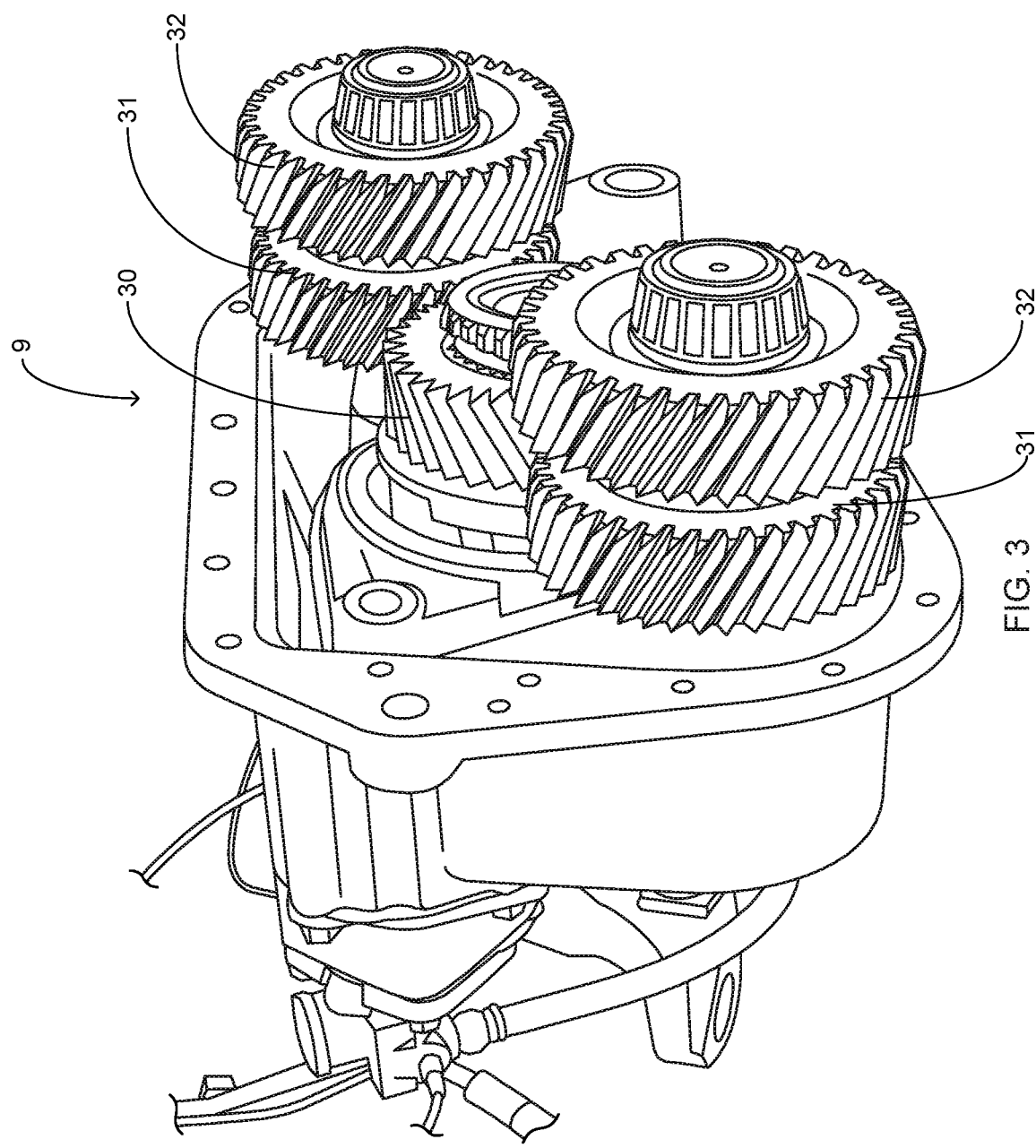
FIG. 3 is a perspective view of a rear side transmission component.

FIG. 2 and FIG. 3, herein illustrate the transmissions 10 of the present invention. As is known in the art, tractor trailer manual transmissions typically range from ten to eighteen gears also referred to as speeds. It should be understood by those skilled in the art that the term gear and speed can be interchangeably utilized in the vernacular of the present field of invention. The transmission 10 illustrated in FIG. 2 is a ten speed transmission. The transmission component 9 illustrated in FIG. 3 herein is the high gear component of the transmission 10. Commonly referred to as the "back-side" transmission, the transmission component 9 is engage with a high/low activator (not illustrated herein) located in the cab of the tractor trailer rig. Ensuing activation of the high/low activator the transmission component 9 is engaged and the gears/speeds are traversed through providing additional gears/speeds for the tractor trailer. The transmission component 9 includes a splitter gear 30 that is configured to move in a forwards-backwards direction so as to engage with gears 31 and gears 32. Utilization of the transmission component 9 changes the ratio of the output at the shaft. The gears 31, 32 are conventional pinion gears having a desired number of teeth to produce the ratio providing the objective of lower engine RPMS's at cruising speed of the vehicle while still transferring the engine torque to the drive wheels.

The transmission 10 illustrated in FIG. 2 is a conventional ten speed transmission having a housing 41 with a plurality of gears 42 disposed therein. The gears 42 are present to provide ascension of speed while maintain a desired transfer of torque to the rear end differential 15 and speed of the vehicle. It is contemplated within the scope of the present invention that the number of gears in the transmission could vary. The gearing ratios of the transmission 10 are changed such that conventional ratios are shifted wherein a conventional ratio for a first gear is between 10.0-12.0 to 1 as opposed to the standard 13.0-15.0 to 1. Starting at 10.0-12.0 to 1 for the first gear for the gears 42 and providing a percent step change that culminates in a final gear ratio of 0.47-0.63 to 1. The final gear ratio of 0.47-0.63 to 1 results in an engine RPM that is operational at a lower range when the vehicle is at cruising speed. By way of example but not limitation, a final gear ratio of 0.47-0.63 to 1 results in an engine RPM between 900-1000 RPM for some engines and applications. The produced lower engine RPM results in less fuel injection cycles over the same time and distance which provides an overall improved fuel economy for the tractor trailer.

The combination of the rear end differential 15 gear ratios of 3.08-3.90 to 1 and the final gear ratio in the transmission of 0.47-0.63 to 1 provides transfer of engine torque to the drive wheels so as to enable a tractor trailer having the drivetrain system 100 of the present invention to effectively pull a load while reducing the amount of torque that remains in the driveline components thus causing excessive wear thereon and premature failure. In a preferred embodiment of the present invention the final gear in the transmission 10 has a ration of 0.47 to 1 to 0.63 to 1. This is combined with a rear end differential 15 gear of 3.08 to 1 to 3.90 to 1. The aforementioned configuration provides a rear end differential gear ratio of 5.4 to 6.4 times greater than the gear ratio of the final gear ratio in the transmission 10. The immediately aforementioned ratio provides a down speeding of the combustible motor 5 in the final gear or speed. This provides the improved fuel economy unattainable with existing technology. A step percentage intermediate the gears 42 in the transmission 10 can range between 0.17 to 0.38 intermediate each gear 42 of the transmission.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A vehicle drivetrain assembly that is disposed within a tractor trailer wherein the drivetrain assembly is configured to provide improved fuel economy for the tractor trailer at highway cruising speeds comprising:
    a frame;
    a combustible motor, said combustible motor operably coupled to said frame;
    a transmission, said transmission being operably coupled to said combustible motor, said transmission having a plurality of gears or speeds, said transmission having a final gear or speed, wherein said final gear or speed within said transmission ranges from 0.47 to 1 to 0.49 to 1;
    a rear end differential, said rear end differential operably coupled to said transmission via a drive shaft, said rear end differential having a gear disposed therein, wherein said gear disposed within said rear end differential ranges from 3.08 to 1 to 3.90 to 1 said rear end differential operably coupled with at least one drive wheel.

2. The vehicle drivetrain assembly as recited in claim 1, wherein each gear or speed within the transmission has a step percentage difference with respect to each other wherein the step percentage ranges from 0.17 to 0.19.

3. The vehicle drivetrain assembly as recited in claim 2, wherein the transmission and rear end differential produce lower RPM's for said combustible motor the final gear or speed of the transmission.

4. The vehicle drivetrain assembly as recited in claim 3, wherein torque produced from the combustible motor is transferred to the at least one drive wheel when said transmission is placed in said final gear.

5. The vehicle drivetrain assembly as recited in claim 4, wherein said transmission has up to eighteen gears or speeds therein.

* * * * *